United States Patent [19]
Flaum et al.

[11] Patent Number: 6,023,163
[45] Date of Patent: Feb. 8, 2000

[54] WELL LOGGING METHOD AND APPARATUS FOR DETERMINING GAS AND DIFFUSION COEFFICIENT USING NMR

[75] Inventors: Charles Flaum, Ridgefield, Conn.; Abdurrahman Sezginer, Houston, Tex.

[73] Assignee: Schlumberger Technology Corporation, Ridgefield, Conn.

[21] Appl. No.: 08/873,582

[22] Filed: Jun. 12, 1997

Related U.S. Application Data

[60] Provisional application No. 60/019,779, Jun. 14, 1996.

[51] Int. Cl.⁷ .................................................. G01V 3/00
[52] U.S. Cl. .......................................... 324/303; 324/300
[58] Field of Search ................................. 324/303, 300, 324/307, 309, 306, 312

[56] References Cited

U.S. PATENT DOCUMENTS

| | | | |
|---|---|---|---|
| 5,023,551 | 6/1991 | Kleinberg et al. | 324/303 |
| 5,055,788 | 9/1991 | Kleinberg et al. | 324/303 |
| 5,153,514 | 10/1992 | Griffin et al. | 324/303 |
| 5,212,447 | 5/1993 | Paltiel | 324/300 |
| 5,497,087 | 3/1996 | Vinegar et al. | 324/303 |
| 5,565,775 | 10/1996 | Stallmach et al. | 324/303 |
| 5,680,043 | 10/1997 | Hurlimann et al. | 324/303 |
| 5,698,979 | 12/1997 | Taicher et al. | 324/303 |

OTHER PUBLICATIONS

Flaum, C., Kleinberg, R., and Hurlimann, M., Identification Of Gas With The Combinable Magnetic Resonance Tool (CMR), Paper L. SPWLA, 37th Annual Logging Symposium, New Orleans, Jun. 16–19, 1996.

Akkurt, R., Vinegar H. J., Tutunjian, P. N., and Guillory, A. J., 1995, NMR Logging Of Natural Gas Reservoirs, Paper N. SPWLA 36th Annual Logging Symposium, Paris.

Prammer, M. G., Mardon, D., coates, G. R., and Miller, M. N., 1995, Lithology–Independent Gas Detection by Gradient–NMR Logging, SPE No. 30562, SPE 70th Annual Technical Conference, Dallas.

Freedman, R. and Morriss, C. E., 1995, Processing Of Data From An NMR Logging Tool, SPE 30560, SPE 70th Annual Technical Conference, Dallas.

*Primary Examiner*—Louis Arana
*Attorney, Agent, or Firm*—Martin M. Novack; Keith G. W. Smith

[57] ABSTRACT

In a method for determining the presence of gas in a region of investigation of earth formations surrounding a borehole. A movable logging device is used to generate two sequences of magnetic field pulses having different pulse spacing times. Each of the pulse sequences elicits a corresponding sequence of nuclear magnetic resonance spin echoes. The presence of gas in the formation, is determined from ratios of signals derived from the two spin echoes sequences.

16 Claims, 7 Drawing Sheets

WELL LOGGING METHOD AND APPARATUS FOR DETERMINING GAS AND DIFFUSION COEFFICIENT USING NMR

RELATED APPLICATION

This application claims priority from U.S. Provisional patent application Ser. No. 60/019,779, filed Jun. 14, 1996, and said Provisional Patent Application is incorporated herein by reference.

FIELD OF THE INVENTION

This invention relates to apparatus and techniques for determining characteristics of earth formations surrounding a borehole and, more particularly, to an apparatus and method for nuclear magnetic resonance (NMR) borehole logging to identify gas and determine diffusion coefficient.

BACKGROUND OF THE INVENTION

In recent years, improved nuclear magnetic well logging devices and techniques have been proposed and/or developed. A summary of these devices and techniques is presented in U.S. Pat. No. 5,023,551. The referenced '551 Patent also reviews basic principles of NMR and NMR logging, and part of that review will be summarized. Reference can be made to the '551 Patent for further detail.

NMR has been a common laboratory technique for forty years, and a theoretical description is available in Abragam, Principles of Nuclear Magnetism, Clarendon Press (Oxford, 1961), and Farrar and Becker, Pulse and Fourier Transform NMR, Academic Press (New York 1971). NMR is based on the fact that the nuclei of many elements have angular momentum ("spin") and a magnetic moment. The nuclear spins align themselves along an externally applied static magnetic field. This equilibrium situation can be disturbed by a pulse of an oscillating magnetic field, which tips the spins away from the static field direction. The angle through which the spins are tipped is under the control of the experimenter, as explained below.

After tipping, two things occur simultaneously. First, the spins precess around the static field at a particular frequency (i.e. the Larmor frequency), given by $\omega_0 = \gamma B_0$, where $B_0$ is the strength of the static field and $\gamma$ is the gyromagnetic ratio, a nuclear constant. Second, the spins return to the equilibrium direction according to a decay time known as the "spin lattice relaxation time" or T1. For hydrogen nuclei, $\gamma/2\pi = 4258$ Hz/Gauss, so for a static field of 235 Gauss, the frequency of precession is 1 MHz. T1 is controlled totally by the molecular environment and is typically ten to one thousand milliseconds in rocks.

Also associated with the spin of molecular nuclei is a second relaxation time known as the "spin-spin relaxation time", or T2. At the end of a ninety degree tipping pulse, all the spins are pointed in a common direction perpendicular to the static field, and they all precess at the Larmor frequency. However, because of small inhomogeneities in the static field due to imperfect instrumentation or microscopic material heterogeneities, each nuclear spin precesses at a slightly different rate. Hence, after a time that is long compared to the precession period, but shorter than T1, the spins will no longer be precessing in unison. When this "dephasing" is due to static field inhomogeneity of the apparatus, the dephasing is sometimes called T2*. When it is due to properties of the material, the dephasing time is called T2. T2 and T2* can be measured independently. For liquids in rocks, T2 is approximately two-thirds of T1.

As aforementioned, the parameters T1 and T2 are sensitive to molecular environment. For example, T2 can be several seconds in an unconfined low viscosity liquid such as water, while it can be as short as ten microseconds in a solid. Liquids confined in the pores of rocks present an intermediate case with T2 in the range of tens to hundreds of milliseconds, depending on pore size and fluid viscosity.

In the basic NMR measurement, a pulse of oscillating field is applied to the sample to tip the spins of the nuclei in the sample. The angle (in radians) through which the spins are tipped is given by the equation $$\theta = \gamma B_1 t_p / 2 \tag{1}$$

where $\gamma$ is the gyromagnetic ratio, $B_1$ is the linearly polarized oscillating field strength, and $t_p$ is the duration of the pulse. Tipping pulses of ninety and one hundred and eighty degrees are the most common.

The precessing spins are detected by voltage induced in a coil. Only that component of the nuclear magnetization that is precessing in the plane perpendicular to the static field can be sensed by the coil. Hence, a signal will be generated after a ninety degree tipping pulse but not after a one hundred eighty degree tipping pulse. In fact, after a one hundred eighty degree tipping pulse, the spins do not precess at all, but just slowly return along the $B_0$ axis to the equilibrium direction.

In measuring the spin-lattice relaxation time T1, many different techniques are known both in the material science arts and in the medical arts. The "inversion recovery" technique suggests that after the nuclei have aligned themselves along the static magnetic field, a one hundred eighty degree pulse is applied to reverse the direction of the spins. Over time, the spins decay toward their equilibrium direction according to T1, but no measurement is yet made as the one hundred eighty degree pulse does not induce a signal in the coil. Before the decay is complete, however, it is interrupted by a ninety degree pulse which rotates the spins into the measurement plane (i.e. induces a signal in the coil). However, the measurable signal lasts only as long as the spins precess in unison. As they dephase, the net magnetization decreases, even if all the spins remain in the transverse plane. Therefore, the signal decays exponentially with time constant T2*, also known as the "free induction decay". Fortunately, the information of interest is the amplitude of the signal immediately after the ninety degree "read out" pulse. This amplitude depends on the "recovery time" ($\tau$) between the original one hundred eighty degree pulse and the ninety degree pulse. Following a determination of amplitude, the spin system is permitted to completely relax back to equilibrium, and the pulse sequence is then repeated preferably numerous times with different recovery times. The detected amplitudes are then plotted against $\tau$ with the decay typically being expressed as a single exponential.

The inversion recovery technique for measuring T1 has been used in laboratories for about forty years. It is very time consuming, and therefore undesirable for well logging and other material property investigations. To overcome some of the shortcomings of inversion recovery, other techniques such as preparation recovery, steady state, and magnetization conserving techniques have been developed. Reference can be made to the above noted U.S. Pat. No. 5,023,551.

While many different methods for measuring T1 have been developed, a single standard known as the CPMG sequence (Carr-Purcell-Meiboom-Gill) for measuring T2 has evolved. In solids, where T2 is very short, T2 can be determined from the decay of the free induction signal. In liquids, where T2*<<T2, the free induction decay becomes a measurement of the apparatus-induced inhomogeneities. To measure the true T2 in such situations, it is necessary to cancel the effect of the apparatus-induced inhomogeneities. To accomplish the same, a series of pulses is applied. First a ninety degree pulse causes the spins to start precessing. Then a one hundred eighty degree pulse is applied to keep the spins in the measurement plane, but to cause the spins which are dispersing in the transverse plane to reverse direction and to refocus. By repeatedly reversing the spins using one hundred eighty degree pulses, a series of "spin echoes" appear. This succession of one hundred eighty degree pulses after an initial ninety degree pulse is the Carr-Purcell sequence which measures the irreversible dephasing (i.e. T2) due to material properties.

While the Carr-Purcell sequence would appear to provide a solution to eliminating apparatus induced inhomogeneities, it was found by Meiboom and Gill that if the one hundred eighty degree pulses in the Carr-Purcell sequence were slightly misset, the transverse magnetization would steadily be rotated out of the transverse plane. As a result, substantial errors would enter the T2 determination. Meiboom and Gill devised a modification to the Carr-Purcell pulse sequence such that after the spins are tipped by ninety degrees and start to dephase, the carrier of the one hundred eighty degree pulses is phase shifted relative to the carrier of the ninety degree pulse. As a result, any error that occurs during an even pulse of the CPMG sequence is cancelled out by an opposing error in the odd pulse.

Identification of the presence of gas in a formation is one of the most important tasks of petrophysical log interpretation. Since NMR is a proton measurement, it is somewhat analogous to the porosity measurement with the neutron tool: it is sensitive to the hydrogen index of the formation, which is significantly reduced in gas. However, unlike the neutron tool, the NMR measurement is insensitive to neutron absorbers, crystalline waters of hydration, and clay bound water. A so-called "Amplitude Method" takes advantage of this to evaluate the gas volume of the formation. The Amplitude Method is summarized, for example, in Flaum, C., Kleinberg, R., and Hurlimann, M., Identification Of Gas With The Combinable Magnetic Resonance Tool (CMR), Paper L. SPWLA, 37th Annual Logging Symposium, New Orleans, Jun. 16–19, 1996.

Recently, much attention has been focused on a secondary phenomenon which can be exploited to use NMR for an independent indication of gas: diffusion.

Exploitation of the diffusion process is based on the fact that molecular diffusion is more rapid in gas than in water or most liquid hydrocarbons.

Diffusion can have a significant effect on the pulsed NMR measurement, since a diffusing molecule with a polarized proton can be displaced an appreciable distance between successive pulses. If the static magnetic field is not uniform, this displacement will cause a dephasing of the transverse magnetization. The result is a noticeable decrease in the relaxation time $T_2$, or a shift in the $T_2$ distribution spectrum to shorter times.

An additional feature of the NMR measurement is that the effect of diffusion depends on the echo spacing. Thus, by varying the echo spacing, the diffusion process can be observed and quantified.

Akkurt, et al. have taken advantage of this phenomenon to propose a qualitative gas detection method, which they call the "shifted spectrum" method. They take two separate measurements of $T_2$ distribution, at two widely differing echo spacings, and present the difference between the two distributions in a waveform, or VDL display. [See Akkurt, R., Vinegar H. J., Tutunjian, P. N., and Guillory, A. J., 1995, NMR Logging Of Natural Gas Reservoirs, Paper N. SPWLA 36th Annual Logging Symposium, Paris.]

The drawback of the shifted spectrum method stems from the fact that it is quite sensitive to the details of the shapes of the individual $T_2$ distribution spectra. In the absence of noise, where the observed shapes are truly representative of the formation behavior, the method would work well. In reality, the shape may be influenced by noise. This is because signal processing in the presence of noise broadens the $T_2$ distributions. In the shifted spectrum method, the signal-to-noise ratio for the two passes can be quite different because the average signal power is much smaller for the longer echo spacing. Thus the difference between the spectra is influenced by the systematic effect of noise. This commonly results in a false positive indication.

A more quantitative approach for gas detection, which will be called the "echo difference" method, was proposed in Prammer, M. G., Mardon, D., Coates, G. R., and Miller, M. N., 1995, Lithology-Independent Gas Detection by Gradient-NMR Logging, SPE No. 30562, SPE 70th Annual Technical Conference, Dallas. An assumed gas diffusion coefficient is used to characterize the difference of echo decays at two different echo spacings. This difference is quantified as a function of oil and gas volumes, assuming that the two are non-wetting, i.e. that they exhibit single component $T_2$ relaxation times, unaffected by the surface effects, and assuming knowledge of the diffusion coefficient of each phase.

A limitation of the echo difference method is that both the $T_2$ and the diffusion coefficient of the gas are needed a priori. Diffusion, in particular, is hard to predict, as it depends not only on the bulk gas diffusion coefficient, but also on the degree of connectivity of the gas phase, since the diffusion process may occur over several pore diameters to show the effect of the field gradient. The gas connectivity, in turn, depends on clay content, pore tortuosity, and, to a large degree, on the gas saturation itself. Furthermore, echo difference can stand improvement in ruling out false gas indications.

SUMMARY OF THE INVENTION

The present invention provides an improved technique and apparatus for identifying gas in subsurface formations that overcomes limitations of prior techniques. In accordance with an embodiment of the method of the invention, there is disclosed a technique for determining the presence of gas in a region of investigation of earth formations surrounding a borehole that includes the following steps: (a) providing a logging device that is moveable through the borehole; (b) generating, from the logging device, a static magnetic field in the region of investigation of the formations; (c) generating, from the logging device, a first sequence of magnetic field pulses in the region of investigation of the formations using a first pulse spacing time, and detecting a first sequence of nuclear magnetic resonance spin echoes from the formations; (d) generating, from the logging device, a second sequence of magnetic field pulses in the region of investigation of the formations using a second pulse spacing time, and detecting a second sequence of nuclear magnetic resonance spin echoes from the formations; and (e) determining the presence of gas in the region of investigation of the earth formations from ratios of echoes of the sequences.

In a disclosed embodiment of the invention, one of the first and second pulse spacing times is a relatively short spacing time, and the other of the first and second pulse spacing times is a relatively long spacing time, the relatively long spacing time being at least 1.5 times longer than said relatively short spacing time. In this embodiment, the number of echoes of at least one of the sequences is modified so that the sequences have echoes that correspond in time, and the ratios of echoes are ratios of amplitudes of echoes that correspond in time.

Further features and advantages of the invention will become more readily apparent from the following detailed description when taken in conjunction with the accompanying drawings.

BRIEF DESCRIPTION OF THE DRAWINGS

FIG. 6, which includes FIGS. 6A and 6B placed one below another, is a flow diagram of a routine for controlling a processor subsystem in accordance with an embodiment of the invention.

DETAILED DESCRIPTION

Figure 1:
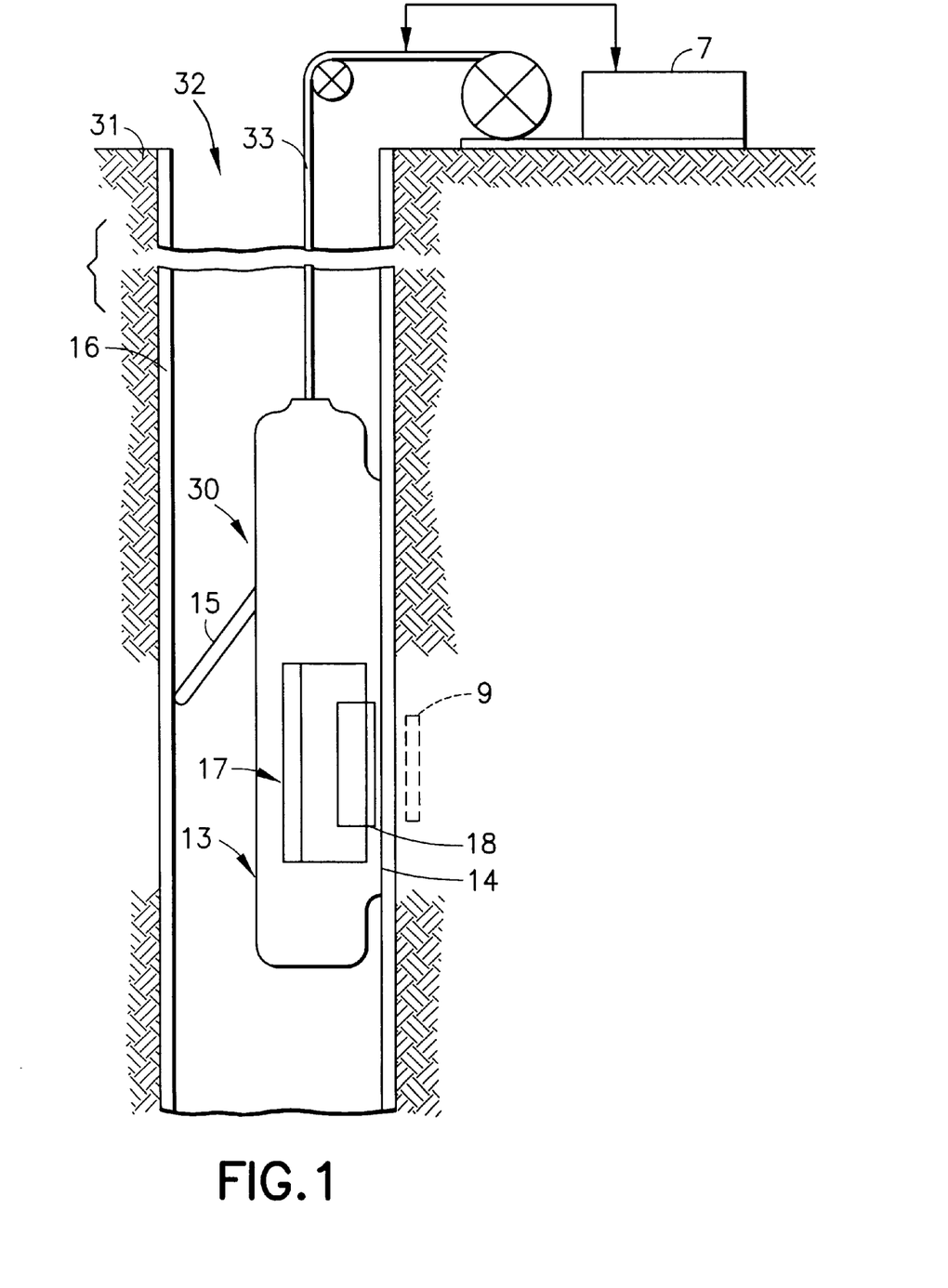
FIG. 1 is a diagram, partially in block form, of a nuclear magnetic resonance logging apparatus which can be used in practicing embodiments of the invention.

Referring to FIG. 1, there is shown an apparatus for investigating subsurface formations 31 traversed by a borehole 32, which can be used in practicing embodiments of the invention. The borehole 32 is typically, although not necessarily, filled with a drilling fluid or mud which contains finely divided solids in suspension, and mudcake 16 is shown on the walls of the borehole.

An investigating apparatus or logging device 30 is suspended in the borehole 32 on an armored cable 33, the length of which substantially determines the relative depth of the device 30. The cable length is controlled by suitable means at the surface such as a drum and winch mechanism (not shown). Surface equipment, represented at 7, can be of conventional type, and can include a processor subsystem and communicates with the downhole equipment. As described in the U.S. Pat. No. 5,055,788, the device 30 has a face 14 shaped to intimately contact the borehole wall, with minimal gaps or standoff, and a retractable arm 15 which can be activated to press the body of the tool 13 against the borehole wall during a logging run, with the face 14 pressed against the wall's surface. Although the tool 13 is shown as a single body, the tool may alternatively comprise separate components such as a cartridge, sonde or skid, and the tool may be combinable with other logging tools. Also, while a wireline is illustrated, alternative forms of physical support and communicating link can be used, for example in a measurement while drilling system.

Figure 3:
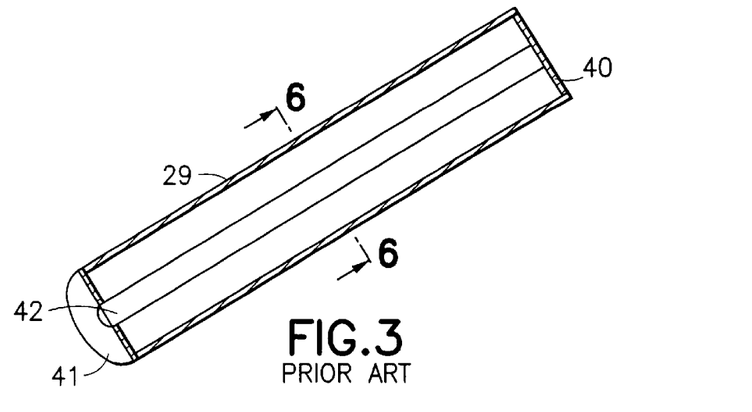
FIG. 3 is a perspective view of the RF antenna of the FIG. 3 nuclear magnetic resonance logging apparatus.

The logging device 30 includes a magnet array 17 and an RF antenna 18 positioned between the array 17 and the wall engaging face 14. Magnet array 17 produces a static magnetic field $B_0$ in regions surrounding the tool 13. The antenna 18 produces, at selected times, an oscillating magnetic field $B_1$ which is focussed into formation 12, and is superposed on the static field $B_0$ within those parts of formation opposite the face 14. The "volume of investigation" of the tool, shown in dotted lines in FIG. 3, is a vertically elongated region directly in front of tool face 14 in which there is a point at which the magnetic field produced by the magnet array 17 has a spatial gradient which is approximately zero. As described in the referenced Patent, the tool 13 can make measurements by magnetically tipping the nuclear spins of particles in formation 12 with a pulse of oscillating field $B_1$, and then detecting the precession of the tipped particles in the static, homogeneous field $B_0$ within the volume of investigation over a period of time.

Figure 2:
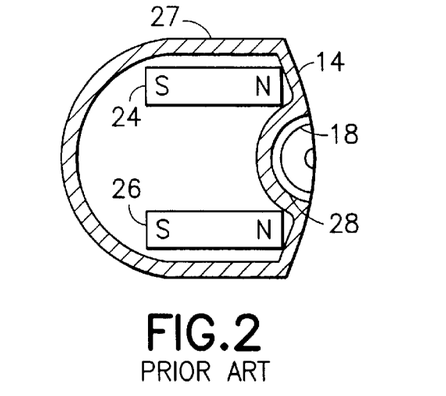
FIG. 2 is a cross-sectional diagram of a portion of the FIG. 3 nuclear magnetic resonance logging apparatus.

FIG. 2 shows a magnet array 17 of the type disclosed in an embodiment of the referenced '788 Patent. The magnet array includes two permanent magnets 24 and 26, which are mounted generally parallel to each other within a metal alloy body 27. The body 27 should be of a material having low magnetic permeability, so as to not interfere with the static magnetic field. Magnets 24 and 26 are slabs which are elongated in the longitudinal direction of the borehole. The magnetic poles of each magnet are not on the smallest faces of the slab, commonly viewed as the ends of a bar magnet: instead, the poles appear on the two opposing edges of the slab magnet and point to the left and right, respectively, in the Figure. Therefore, within the formation 12, the magnetic field $B_0$ surrounding the magnets remains fairly constant along the longitudinal direction of the borehole axis. In the illustration of FIG. 2, magnets 24, 26 are symmetrically mounted in the two sides of the body 27 with the north poles facing the same direction, that is, the direction of the face 14 of the tool. One or more further permanent magnets can be used.

Figure 4:
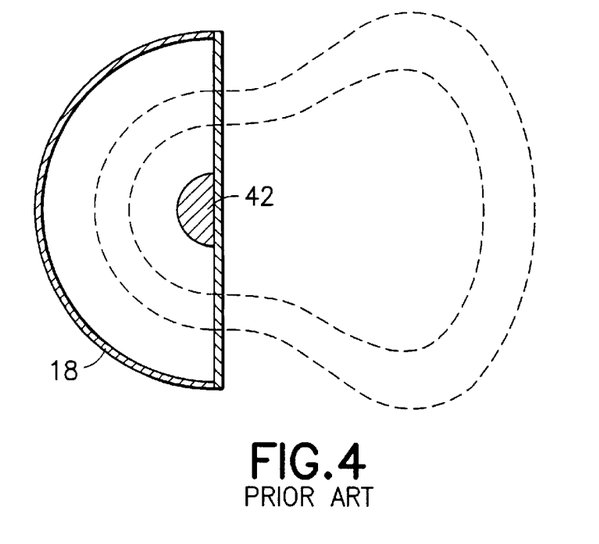
FIG. 4 is a cross-sectional view of the RF antenna of FIG. 3, as taken through a section defined by the arrows 6—6 in FIG. 3.

As described in the referenced '788 Patent, the metal body 27 has, on the front face 14 thereof, a semi-cylindrically shaped cavity or slot 28 which faces formations engaged by the face 14. The cavity 28 is adapted for receiving an RF antenna 18 that is shown in FIGS. 3–4. The antenna 18 is positioned outside of the metal body 27 (FIG. 2) of the tool, and is thereby shielded from electromagnetic communication with regions of the borehole which lie behind the body 27, or regions of other formations in directions intercepted by the body 27. Antenna 18 is thus responsive only to magnetic fields originating in front of the wall engaging face 14, e.g. fields originating in the formation 12 or in the mudcake or mud which contacts face 14 in the vicinity of the antennas 18. In a disclosed embodiment of the referenced Patent, the body 27 is made of metal alloy sheathing, rigidly attached to interior metal bracing, which envelops most components of the tool other than the antenna 18, including the circuitry, the magnet array 17, and the hydraulics system of the arm 15. The Patent points out that the body 27 can alternatively be constructed of other materials, so long as the overall structure is sufficiently strong and the magnetic field of the magnet array 17 can penetrate the body and enter the adjoining formation 12.

In the referenced '788 Patent, the antenna 18 is used both as an RF transmitter to produce an oscillating magnetic field in the formations, and as a receiving antenna to detect coherent magnetic signals emanating from precessing protons (spins) after the oscillating field is terminated. The antenna, which has a body 29 and an elongated center probe 42, across which signals are applied and detected, serves effectively as a current loop which produces an oscillating magnetic field $B_1$ (see FIG. 4) within the volume of investigation that is perpendicular to the static magnetic field, $B_0$ (which is radial in the volume of investigation). The body 29 is trough-shaped and has end plates 40, 41 with the center conductor or probe 42 extending from one end plate 40 to the other end plate 41, parallel to and centered in the semi-cylindrical trough 29. The U.S. Pat. No. 5,153,514 discloses that the trough antenna, which can be filled with a ferrite, can have an inner conductive shell that is separated from a steel body by a rubber layer, which suppresses magnetoacoustic ringing. It will be understood that various other types of NMR logging equipment can be used in practicing the invention.

Figure 5:
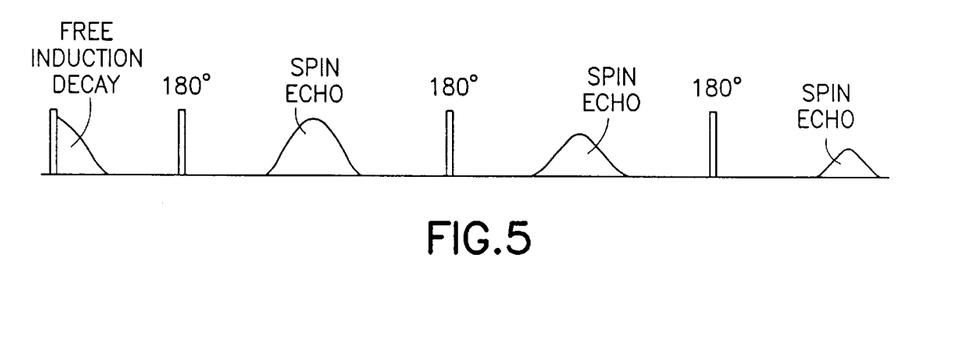
FIG. 5 is a diagram of an embodiment of a nuclear magnetic resonance pulse sequence that can be used in an embodiment of the invention.

In an illustrated embodiment hereof, the pulse sequence used can be a conventional type of Carr Purcell or CPMG sequence as illustrated in FIG. 5. However, it will be understood that any other suitable type of pulse sequence can be used, consistent with the principles hereof.

In an embodiment hereof there is determined, from the comparison of the data from two passes, the apparent diffusion coefficient D. An advantage of this method, is that it not only detects gas more reliably than prior art methods, but also that the quantitative measurement of D gives an indication of mobility, or connectivity of the gas.

In describing how D can be measured, one can start with the general approximate expression for the observed echo amplitude as a function of time, t, for a single, non-wetting phase:

$$A(t,T_E,D) = A_0 \int J(G) \int_0^\infty B(T_{2B}) exp(-t/T_{2B}) \, exp(-t/T_{2D}) dT_{2B} dG \quad (1a)$$

where:

$$T_{2D} = 12/(G^2 \gamma^2 T_E^2 D) \quad (1b)$$

The symbols used in eg. (1) are defined as:
$A_O$=amplitude at zero time, proportional to initial polarization, or porosity.
t=time, sec
$T_E$=echo spacing, sec
D=diffusion coefficient, $cm^2$/sec
G=magnetic field gradient, gauss/cm
J(G)=magnetic field gradient distribution, cm/gauss
$T_{2B}$=diffusion-free relaxation time, sec
$B(T_{2B})$=$T_{2B}$ distribution, $sec^{-1}$
$\gamma$=proton gyromagnetic ratio, equal to $2\pi \cdot 4258$/gauss-sec The first integral of eq. (1) is over all gradients, and the second is over all $T_{2B}$'s. It can be seen that the first exponential corresponds to the diffusion process which modulates the diffusion-free $T_{2B}$ relaxation of the second exponential, resulting in the observed relaxation $T_2$.

It is very convenient to rewrite eq. (1) to separate the effect of $T_{2B}$ from that of diffusion, assuming that there is no interdependence between G and $T_{2B}$:

$$A(t,T_E, D) = A_0 \int_0^\infty B(T_{2B}) exp(-t/T_{2B}) \, dT_{2B} \int J(G) exp(-t/T_{2D}) dG \quad (2)$$

(note that $T_{2D}$ is a function of G). If the field gradient were uniform in the measurement region, eq. (2) would simplify into a single integral over $T_{2B}$, modulated by an exponential time function. The logging tool described above has a distribution of gradients. Thus, to model the measured echo amplitude as a function of time, we need to know not only the formation $T_{2B}$ distribution and the diffusion coefficient, but also the distribution of the gradients of the magnetic field over the measurement region.

This distribution, for the logging tool described above, can be obtained by careful mapping of the tool generated fields. There is also a more direct approach to obtaining this information. Examination of eq. (2) shows that the second integral does not actually have to be performed explicitly. It can be obtained directly from a measurement with a sample of fluid, e.g. a water bottle, of known $T_{2B}$. Knowing $T_{2B}$, the first integral of eq. (2) can be evaluated explicitly, and the second integral is found simply by dividing the measured echo amplitude by the first integral. The next step is a variable transformation of time t to normalized time $\tau$:

$$\tau = (T_E/T_{ER})^2 (D/D_W)t \quad (3)$$

where $D_W$ is the water diffusion constant, and $T_{ER}$ is the echo spacing for the water bottle measurement. Using the above, we can transform a water bottle measurement into a general function evaluating the needed integral over the field gradient:

$$F(\tau) = \int J(G) exp(-\tau/T_{2DW}) dG \quad (4)$$

where $T_{2DW}$ is given by eq. (1b) for $T_E = T_{ER}$, and $D=D_W$. $F(\tau)$ is the water bottle data curve fit (divided by the $T_{2B}$ relaxation term) with $\tau = t$.

Figure 8:
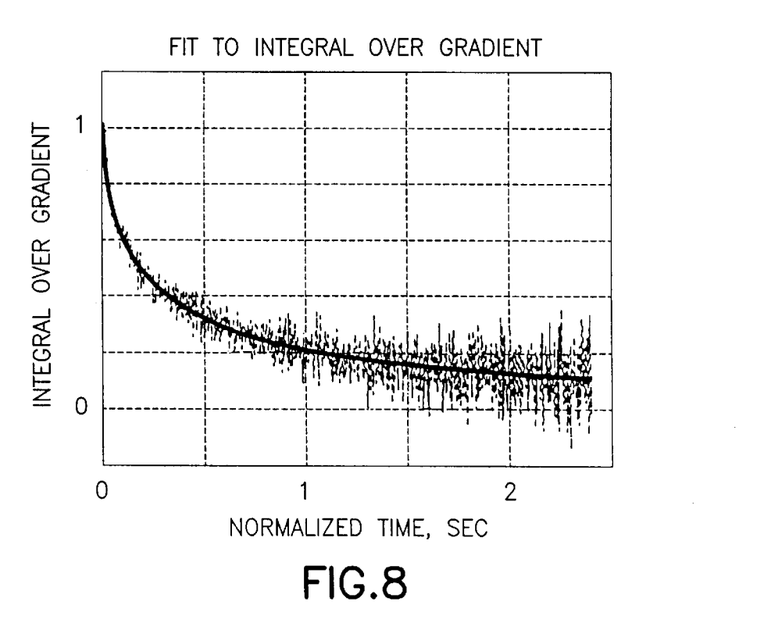
FIG. 8 is a graph of determination of the integral over the field gradient, using water bottle data.

The above can be implemented by using a singular value decomposition [see Freedman, R. and Morriss, C. E., 1995, Processing Of Data From An NMR Logging Tool, SPE 30560, SPE 70th Annual Technical Conference, Dallas] fit to the distilled water bottle data taken with the above described tool, at $T_{ER}$=2 msec. The $T_{2B}$ value for the water was 1.8 sec, and the diffusion coefficient value of $2 \cdot 10^{-5}$ $cm^2$/gauss was used. The data and the fit are shown in FIG. 8. Eq. (4) can now be used to predict the behavior of a ratio of echo amplitude trains taken at two different $T_E$ values as a function of time, for any value of D:

$$A(t,T_{E\text{-}short})/A(t,T_{E\text{-}long}) = F(\tau_{short})/F(\tau_{long}) \quad (5)$$

Figure 9:
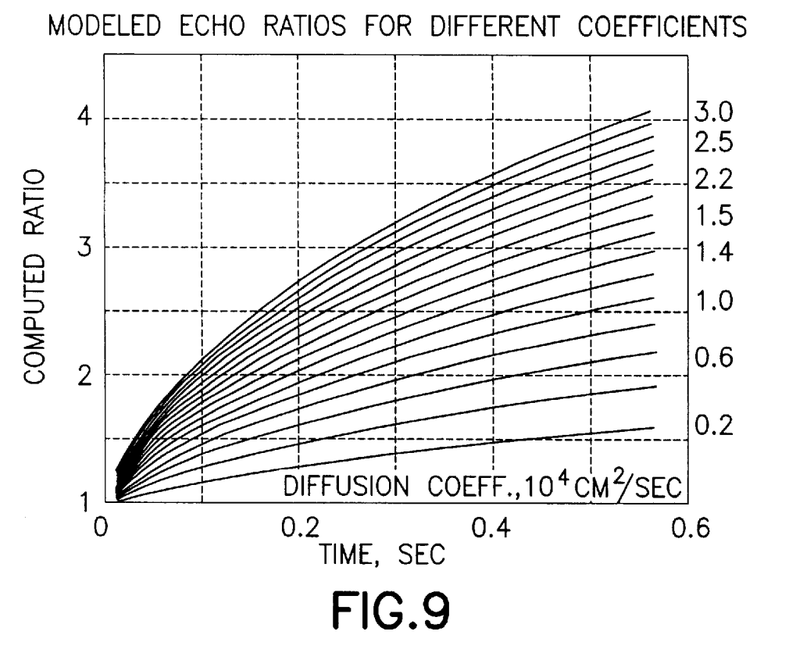
FIG. 9 is a graph of the modeling of the time-dependence ratio of echoes at two different echo spacings, as a function of diffusion coefficient.

FIG. 9 shows a series of modeled values of the amplitude ratio, for $T_{E\text{-}short}$=0.32 msec, and $T_{E\text{-}long}$=1.0 msec.

The value of D can now be extracted from the measured time-dependent echo ratios. Parametrizing D in terms of the first moment of the ratio-time distribution (less unity):

$$M(D) = \Sigma_t \, t \, [F(\tau_{short})/F(\tau_{long}) - 1] \quad (6)$$

This appeared to give the best compromise between capturing the monotonically increasing value of the ratio with time, and the corresponding increase in noise. Empirically, one can find:

$$D = aM^2 + bM \quad (7)$$

Figure 10:
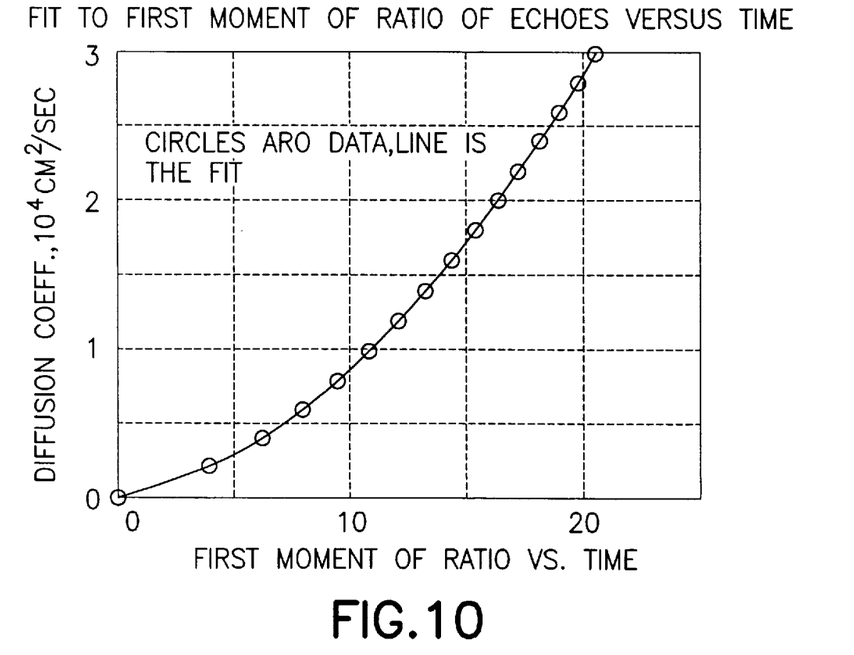
FIG. 10 is a graph of quadratic fit to determine diffusion coefficient from the first moment of ratio-time curve.

The moments computed from the modeled ratios of FIG. 9, are shown in FIG. 10.

D can now be computed from the data. In the actual implementation, however, one needs to worry about the effect of noise, especially if one also wishes to generate a waveform, or variable density (VDL) display of the ratios. Therefore, instead of using the ratios of measured echoes, one can take instead the ratios of echoes recomputed from the fitted $T_2$ distributions. The fit, in this case, acts only as an intelligent data smoother. The data can be, in addition, filtered over depth. To avoid taking ratios of small numbers, which would amplify noise, computation of D can be suppressed for porosities lower than a given porosity, for example 3 porosity units. To summarize the steps taken to determine D from log data:

1. Parameters a and b of eq. (7) are derived from water bottle data at long $T_{ER}$.
2. $T_2$ distributions from the two log passes are used to reconstruct smoothed echo trains at (typically) 30 time samples.
3. Vertical depth averaging can be applied, if not already applied in $T_2$ determination.
4. Echo ratios are computed, with short echo data in the numerator. The ratios should be displayed in VDL form, for quality control.
5. The first moments are computed by substituting eq. (5) in eq. (6).
6. The diffusion coefficient is compute using eq. (7).
7. Examination of the VDL ratio display should clearly differentiate between high apparent D values due to gas, and those due to other effects, such as rugosity or noise. Gas intervals should show a monotonically increasing value of ratio with time.

It should be noted that the above discussion describes the behavior of a single diffusing phase, i.e., gas. In reality, more phases can be present, e.g. the zone may be partially invaded and a gas-water mixture present. The equations would become much more complicated, but as long as the other phases exhibit shorter $T_2$ relaxation times than the gas phase, the echo ratio would still exhibit the characteristic monotonically increasing shape. The result would be a reduced value of D. If the non-diffusing phase has a much longer $T_2$, the echo ratio would start dropping back to unity at longer times. Fortunately, in real situations, the non-diffusing phase does usually have shorter relaxation time. In particular, if it is water, and it is the wetting phase (as it usually is), the relaxation times are shortened by the interactions with the grain surfaces. In fact, this method is particularly effective in highlighting water-free gas production, since in such cases, the water signal would be dominated by surface effects, i.e., exhibit short $T_2$.

Figure 6A:
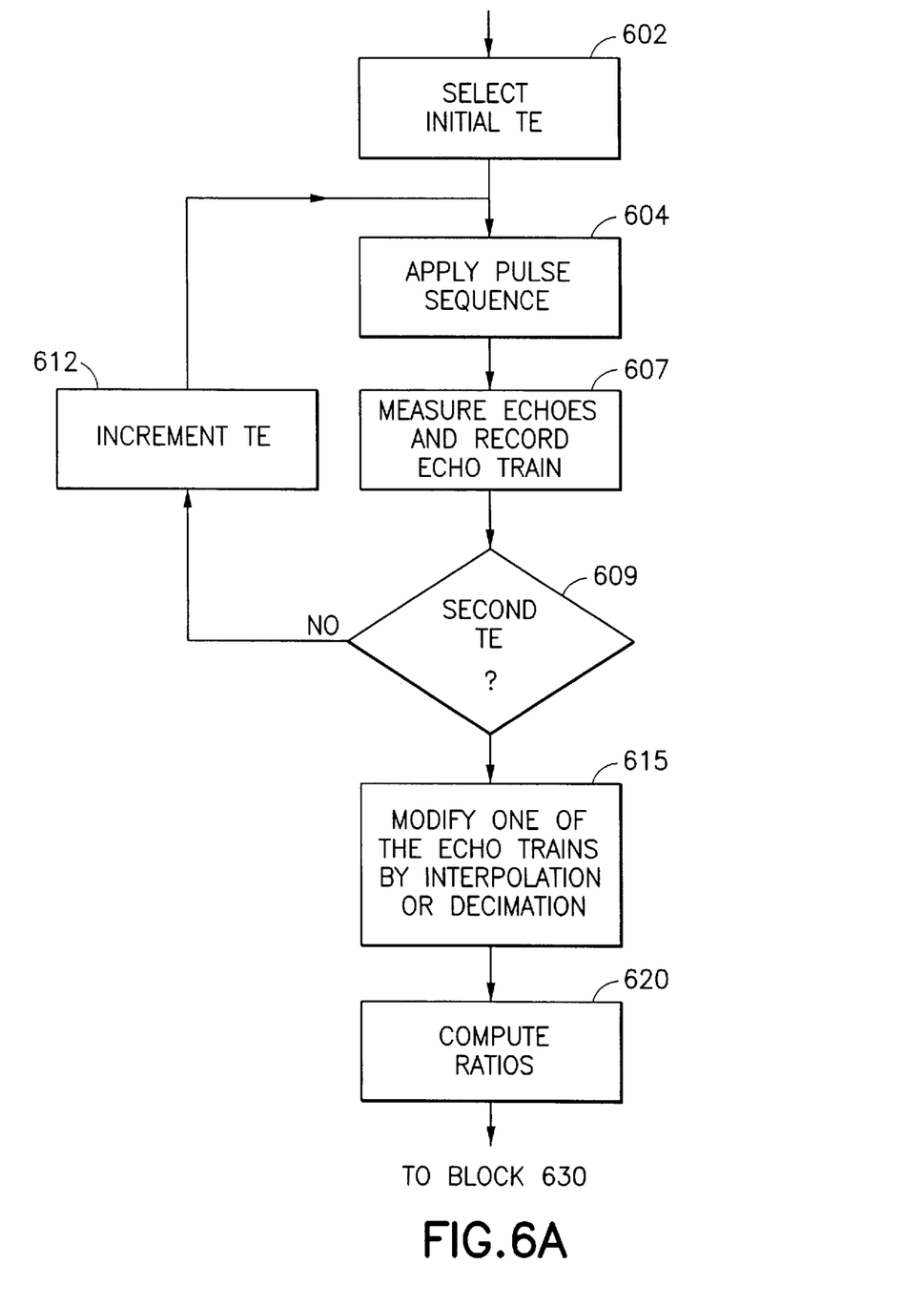
Figure 6B:
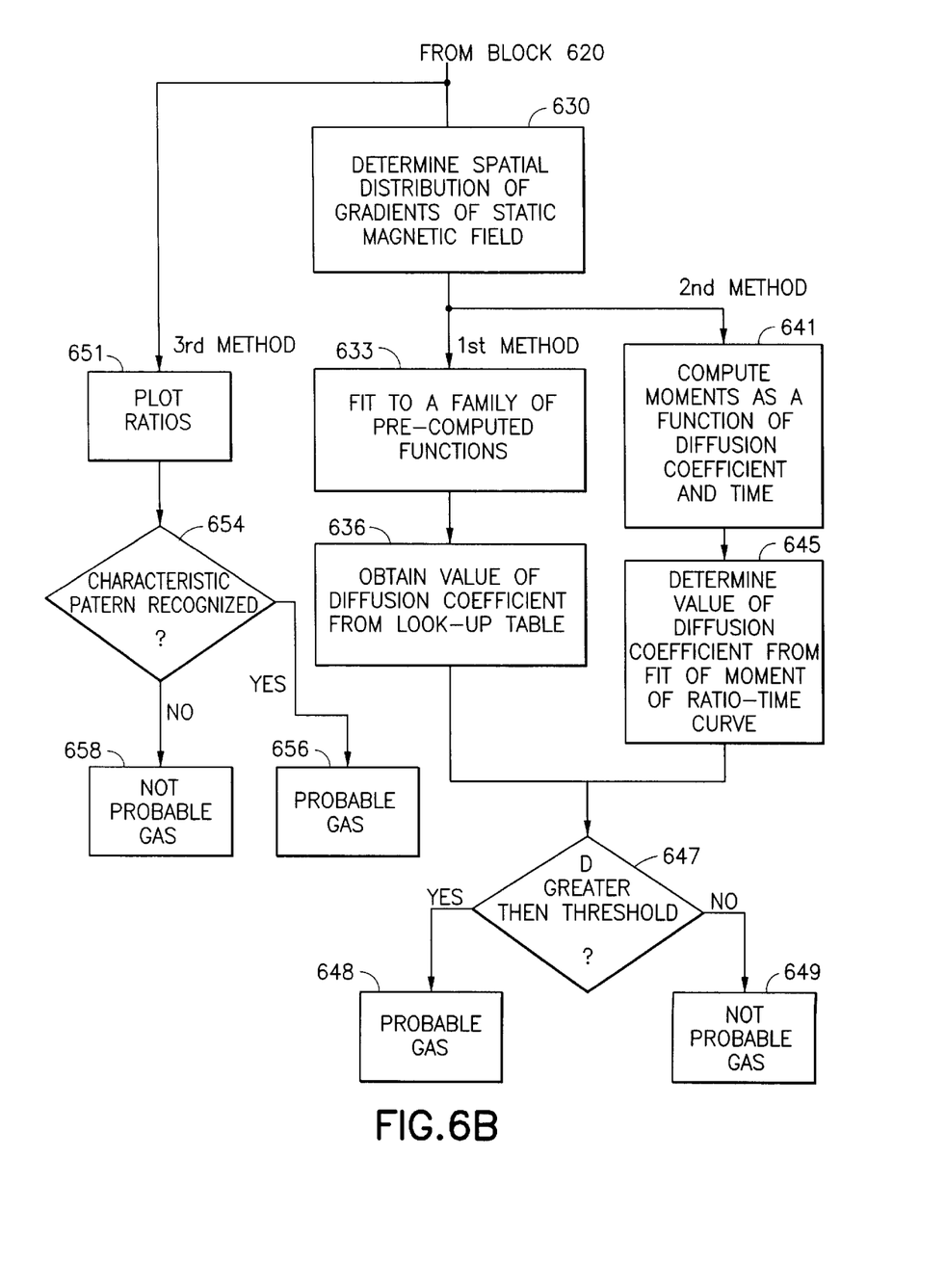

Referring to FIG. 6, there is shown a flow diagram of a routine for controlling a processor in accordance with embodiments of the invention. The processor can be the downhole processor, the uphole processor, or a remote processor which operates subsequently on stored and/or transmitted log-representative signals, as well as combinations of downhole, uphole, and remote processors. In FIG. 6, the block 602 represents the selecting of an initial echo spacing TE. The block 604 represents applying the pulse sequence which, in the present embodiment, can be a conventional CPMG sequence, although it will be understood that other suitable sequences could be used. The echo train (e.g., FIG. 5) is then measured and recorded, as represented by the block 607. A determination is then made (block 609) as to whether processing has been implemented for two echo spacings (decision block 609). If not, the echo spacing is incremented (block 612), the block 604 is reentered, and, using the second echo spacing, the pulse sequence is again applied and the echo train is measured and recorded (block 607). Preferably, the second echo spacing will be at least 1.5 times as long as the first echo spacing (or vice versa), and, more preferably, the difference will be greater, e.g. three to one. Also the measurements can be taken during the same or during different logging passes.

Since, over a given time period, the echo trains will contain different numbers of echoes, the next block, block 615, represents adjusting of the echo train data so that there are corresponding data points over the time period being considered.

This can be done, for example, by interpolating in the data resulting from the longer TE spacing (which has fewer echoes in the specified time period) or by decimating the data resulting from the shorter TE spacing (which has a greater number of echoes in the specified time period), or a combination of such techniques can be used. The block 620 is then entered, this block representing an echo-by-echo computation of the ratio of corresponding (in time) echoes, and the storage of the computed ratios.

Figure 7A:
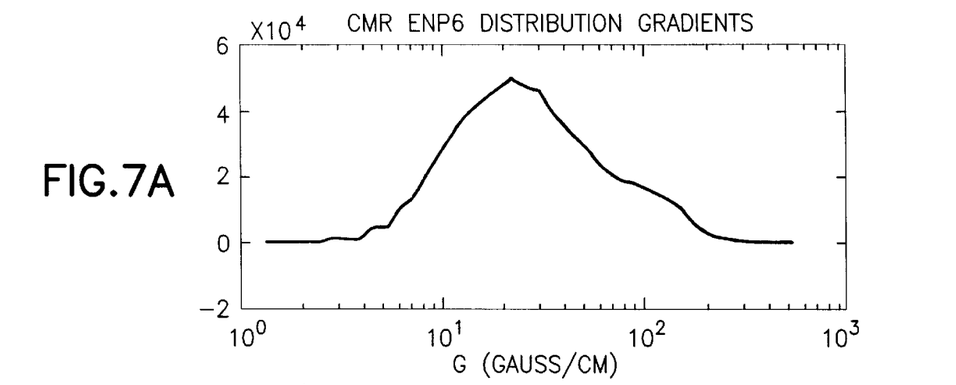
FIGS. 7A, 7B, and 7C is an example of gradient field distribution of the static magnetic field.
Figure 7B:
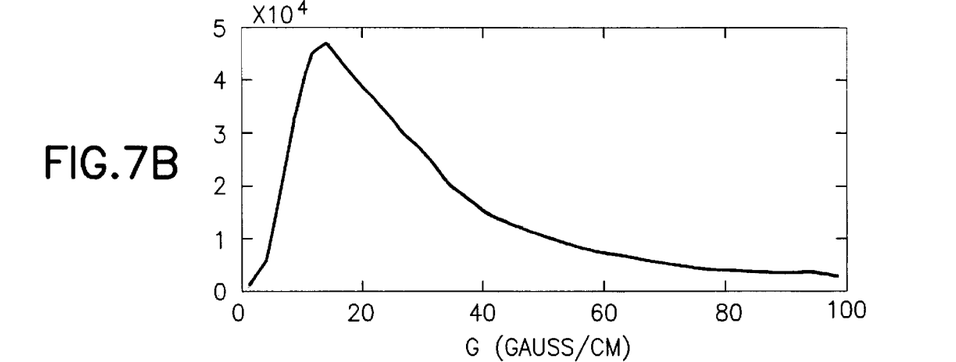
Figure 7C:
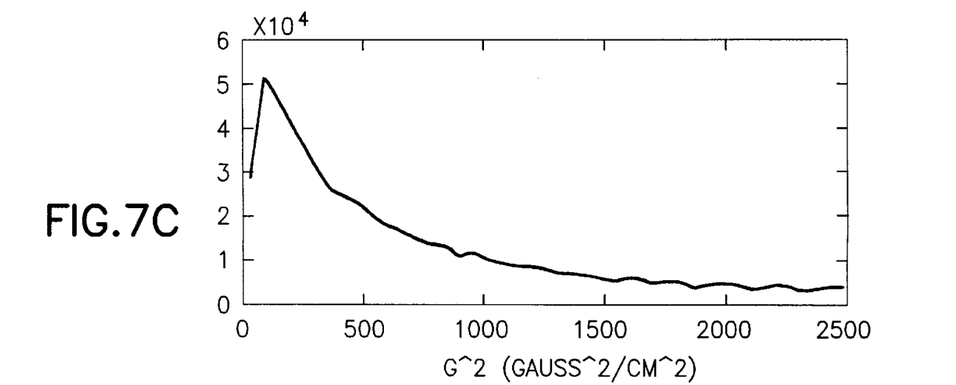

One output of the block 620, when a first or second method hereof is being used, is coupled to a block 630, this block representing the determination of spatial distribution of gradients of the static magnetic field (see FIGS. 7A, 7B, and 7C for an example of same). In a first method hereof, as represented by the block 633, a family of pre-computed functions is developed (see e.g. FIG. 9). Diffusion coefficients can be plotted as a function of computed ratio and time and, if desired, loaded into a look-up table. Then, as represented by block 636, a value of diffusion coefficient can be determined from the look-up table, using interpolation, if necessary. In a second method hereof, the block 641 represents computation of moments as a function of diffusion coefficient and time (see e.g. FIG. 10), and the diffusion coefficient can be determined, for example, from the quadratic fit. If desired, interpolation and/or look-up table can be utilized.

In a third method, the block 651 is entered, this block representing the plotting of ratios (block 651) and a determination is made (decision block 654) as to whether a characteristic pattern is recognized. If so, a conclusion of the probable presence of gas can be drawn (block 656) and, if not, the opposite conclusion can be drawn (block 658). As indicated, using a family of characteristic patterns, the plotted ratios can be quantified to determine a quantitative gas indication. Similarly, using the diffusion coefficient outputs of blocks 636 and 645, the diffusion coefficient can be evaluated to determine the probability of the presence of gas (blocks 647–649), and/or the same can be quantified.

We claim:

1. A method for determining the presence of gas in a region of investigation of earth formations surrounding a borehole, comprising the steps of:
   a) providing a logging device that is moveable through the borehole;
   b) generating, from said logging device, a static magnetic field in the region of investigation of the formations;
   c) generating, from said logging device, a first sequence of magnetic field pulses in the region of investigation of the formations using a first pulse spacing time, and detecting a first sequence of nuclear magnetic resonance spin echoes from the formations;
   d) generating, from said logging device, a second sequence of magnetic field pulses in the region of investigation of the formations using a second pulse spacing time, and detecting a second sequence of nuclear magnetic resonance spin echoes from the formations; and
   e) determining the presence of gas in the region of investigation of the earth formations from ratios of signals derived from the detected first sequence of echoes and signals derived from the detected second sequence of echoes.

2. The method as defined by claim 1, wherein one of said first and second pulse spacing times is a relatively short spacing time, and the other of said first and second pulse spacing times is a relatively long spacing time, said relatively long spacing time being at least 1.5 times longer than said relatively short spacing time.

3. The method as defined by claim 2, wherein the number of echoes of at least one of said sequences is modified so that said sequences have echo-representative signals that correspond in time, and wherein said ratios are ratios of amplitudes of signals derived from the detected first sequence of echoes and signals derived from the detected second sequence of echoes that correspond in time.

4. The method as defined by claim 3, further comprising deriving the spatial magnetic field gradient of said static field, and wherein said step of determining the presence of gas comprises determining the presence of gas as a function of said spatial magnetic field gradient and said ratios.

5. The method as defined by claim 1, further comprising deriving the spatial magnetic field gradient of said static field, and wherein said step of determining the presence of gas comprises determining the presence of gas as a function of said spatial magnetic field gradient and said ratios.

6. The method as defined by claim 5, wherein said determination of the presence of gas is implemented for formations surrounding a particular depth level in the borehole, and further comprising repeating the recited steps and determination for other depth levels, and producing a log representative of gas as a function of depth level.

7. The method as defined by claim 1, wherein said determination of the presence of gas is implemented for formations surrounding a particular depth level in the borehole, and further comprising repeating the recited steps and determination for other depth levels, and producing a log representative of gas as a function of depth level.

8. A method for determining diffusion coefficient in a region of investigation of earth formations surrounding a borehole, comprising the steps of:

a) providing a logging device that is moveable through the borehole;

b) generating, from said logging device, a static magnetic field in the region of investigation of the formations;

c) generating, from said logging device, a first sequence of magnetic field pulses in the region of investigation of the formations using a first pulse spacing time, and detecting a first sequence of nuclear magnetic resonance spin echoes from the formations;

d) generating, from said logging device, a second sequence of magnetic field pulses in the region of investigation of the formations using a second pulse spacing time, and detecting a second sequence of nuclear magnetic resonance spin echoes from the formations; and e) determining the diffusion coefficient in the region of investigation of the earth formations from ratios of signals derived from the detected first sequence of echoes and signals derived from the detected second sequence of echoes.

9. The method as defined by claim 8, wherein one of said first and second pulse spacing times is a relatively short spacing time, and the other of said first and second pulse spacing times is a relatively long spacing time, said relatively long spacing time being at least 1.5 times longer than said relatively short spacing time.

10. The method as defined by claim 9, further comprising deriving the spatial magnetic field gradient of said static field, and wherein said step of determining diffusion coefficient comprises determining confusion coefficient as a function of said spatial magnetic field gradient and said ratios.

11. The method as defined by claim 8, wherein the number of echoes of at least one of said sequences is modified so that said sequences have echo-representative signals that correspond in time, and wherein said ratios are ratios of amplitudes of signals derived from the detected first sequence of echoes and signals derived from the detected second sequence of echoes that correspond in time.

12. The method as defined by claim 8, further comprising deriving the spatial magnetic field gradient of said static field, and wherein said step of determining diffusion coefficient comprises determining confusion coefficient as a function of said spatial magnetic field gradient and said ratios.

13. The method as defined claim 8, wherein said determination of diffusion coefficient is implemented for formations surrounding a particular depth level in the borehole, and further comprising repeating the recited steps and determination for other depth levels, and producing a log representative of diffusion coefficient as a function of depth level.

14. The method as defined claim 9, wherein said determination of diffusion coefficient is implemented for formations surrounding a particular depth level in the borehole, and further comprising repeating the recited steps and determination for other depth levels, and producing a log representative of diffusion coefficient as a function of depth level.

15. A nuclear magnetic logging system for determining the presence of gas in a region of investigation of earth formations surrounding a borehole, comprising:

a logging device that is moveable through the borehole;

means in said logging device for generating a static magnetic field in the formations;

means in said logging device for generating a first sequence of magnetic field pulses in the region of investigation of the formations using a first pulse spacing time, and for detecting a first sequence of nuclear magnetic resonance spin echoes from the formations;

means in said logging device for generating a second sequence of magnetic field pulses in the region of investigation of the formations using a second pulse spacing time, and for detecting a second sequence of nuclear magnetic resonance spin echoes from the formations; and means for determining the presence of gas in the region of investigation of the earth formations from ratios of signals derived from the detected first sequence of echoes and signals derived from the detected second sequence of echoes.

16. A nuclear magnetic logging system for determining diffusion coefficient in a region of investigation of earth formations surrounding a borehole, comprising:

a logging device that is moveable through the borehole;

means in said logging device for generating a static magnetic field in the formations;

means in said logging device for generating a first sequence of magnetic field pulses in the region of investigation of the formations using a first pulse spacing time, and for detecting a first sequence of nuclear magnetic resonance spin echoes from the formations;

means in said logging device for generating a second sequence of magnetic field pulses in the region of investigation of the formations using a second pulse spacing time, and for detecting a second sequence of nuclear magnetic resonance spin echoes from the formations; and means for determining the diffusion coefficient in the region of investigation of the earth formations from ratios of signals derived from the detected first sequence of echoes and signals derived from the detected second sequence of echoes.

* * * * *